(12) United States Patent
Clark et al.

(10) Patent No.: US 9,164,949 B1
(45) Date of Patent: Oct. 20, 2015

(54) SYSTEM AND METHOD FOR LUN AND CACHE MANAGEMENT

(71) Applicant: EMC Corporation, Hopkinton, MA (US)

(72) Inventors: Roy E. Clark, Hopkinton, MA (US); Philip Derbeko, Modiin (IL); Arieh Don, Newton, MA (US); Yaron Dar, Sudbury, MA (US)

(73) Assignee: EMC Corporation, Hopkinton, MA (US)

( * ) Notice: Subject to any disclaimer, the term of this patent is extended or adjusted under 35 U.S.C. 154(b) by 203 days.

(21) Appl. No.: 13/730,192

(22) Filed: Dec. 28, 2012

(51) Int. Cl.
*G06F 15/167* (2006.01)
(52) U.S. Cl.
CPC ................................. *G06F 15/167* (2013.01)
(58) Field of Classification Search
None
See application file for complete search history.

(56) References Cited

U.S. PATENT DOCUMENTS

| | | | |
|---|---|---|---|
| 2003/0061240 A1* | 3/2003 | McCann et al. | 707/200 |
| 2008/0126857 A1* | 5/2008 | Basham et al. | 714/25 |
| 2009/0106248 A1* | 4/2009 | Vaghani et al. | 707/8 |
| 2010/0017409 A1* | 1/2010 | Rawat et al. | 707/8 |
| 2012/0089786 A1* | 4/2012 | Pruthi | 711/141 |

* cited by examiner

*Primary Examiner* — Chris Parry
*Assistant Examiner* — Stephen Houlihan
(74) *Attorney, Agent, or Firm* — Brian J. Colandreo; Mark H. Whittenberger; Holland & Knight LLP

(57) ABSTRACT

A method, computer program product, and computing system for defining a first server and a second server within a server cluster. The first server includes a first cache system and the first and second servers are coupled to a data array that includes a LUN. The LUN is reserved for exclusive access by the first server, thus generating a first server reservation. Data associated with the LUN is cached within the first cache system of the first server. A loss of the first server reservation is sensed. In response to a loss of the first server reservation, the first cache system of the first server is purged.

12 Claims, 3 Drawing Sheets

SYSTEM AND METHOD FOR LUN AND CACHE MANAGEMENT

TECHNICAL FIELD

This disclosure relates to LUN systems and, more particularly, to systems and methods for LUN management.

BACKGROUND

Storing and safeguarding electronic content is of paramount importance in modern business. Accordingly, various systems may be employed to protect such electronic content.

The use of high-availability data arrays is increasing in popularity, wherein each data array may be configured to serve a plurality of hosts (e.g., servers). Typically, data arrays are apportioned into a plurality of LUNs (i.e., logical drives) that are accessed by and/or assigned to hosts. Additionally, these hosts may be configured in clusters. Unfortunately, issues may arise concerning what host within the cluster controls a particular LUN.

SUMMARY OF DISCLOSURE

In one implementation, a computer-implemented method includes defining a first server and a second server within a server cluster. The first server includes a first cache system and the first and second servers are coupled to a data array that includes a LUN. The LUN is reserved for exclusive access by the first server, thus generating a first server reservation. Data associated with the LUN is cached within the first cache system of the first server. A loss of the first server reservation is sensed. In response to a loss of the first server reservation, the first cache system of the first server is purged.

One or more of the following features may be included. In response to a loss of the first server reservation, caching within the first cache system of the first server may be suspended. In response to a loss of the first server reservation, re-reserving the LUN for exclusive access by the first server may be periodically attempted. The loss of the first server reservation may be in response to the second server accessing the LUN. The second server may include a second cache system. The LUN may be reserved for exclusive access by the second server, thus generating a second server reservation. Data associated with the LUN may be cached within the second cache system of the second server. A loss of the second server reservation may be sensed. In response to sensing a loss of the second server reservation, the second cache system of the second server may be purged.

In another implementation, a computer program product resides on a computer readable medium that has a plurality of instructions stored on it. When executed by a processor, the instructions cause the processor to perform operations including defining a first server and a second server within a server cluster. The first server includes a first cache system and the first and second servers are coupled to a data array that includes a LUN. The LUN is reserved for exclusive access by the first server, thus generating a first server reservation. Data associated with the LUN is cached within the first cache system of the first server. A loss of the first server reservation is sensed. In response to a loss of the first server reservation, the first cache system of the first server is purged.

One or more of the following features may be included. In response to a loss of the first server reservation, caching within the first cache system of the first server may be suspended. In response to a loss of the first server reservation, re-reserving the LUN for exclusive access by the first server may be periodically attempted. The loss of the first server reservation may be in response to the second server accessing the LUN. The second server may include a second cache system. The LUN may be reserved for exclusive access by the second server, thus generating a second server reservation. Data associated with the LUN may be cached within the second cache system of the second server. A loss of the second server reservation may be sensed. In response to sensing a loss of the second server reservation, the second cache system of the second server may be purged.

In another implementation, a computing system includes at least one processor and at least one memory architecture coupled with the at least one processor, wherein the computing system is configured to perform operations including defining a first server and a second server within a server cluster. The first server includes a first cache system and the first and second servers are coupled to a data array that includes a LUN. The LUN is reserved for exclusive access by the first server, thus generating a first server reservation. Data associated with the LUN is cached within the first cache system of the first server. A loss of the first server reservation is sensed. In response to a loss of the first server reservation, the first cache system of the first server is purged.

One or more of the following features may be included. In response to a loss of the first server reservation, caching within the first cache system of the first server may be suspended. In response to a loss of the first server reservation, re-reserving the LUN for exclusive access by the first server may be periodically attempted. The loss of the first server reservation may be in response to the second server accessing the LUN. The second server may include a second cache system. The LUN may be reserved for exclusive access by the second server, thus generating a second server reservation. Data associated with the LUN may be cached within the second cache system of the second server. A loss of the second server reservation may be sensed. In response to sensing a loss of the second server reservation, the second cache system of the second server may be purged.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

Figure 1:
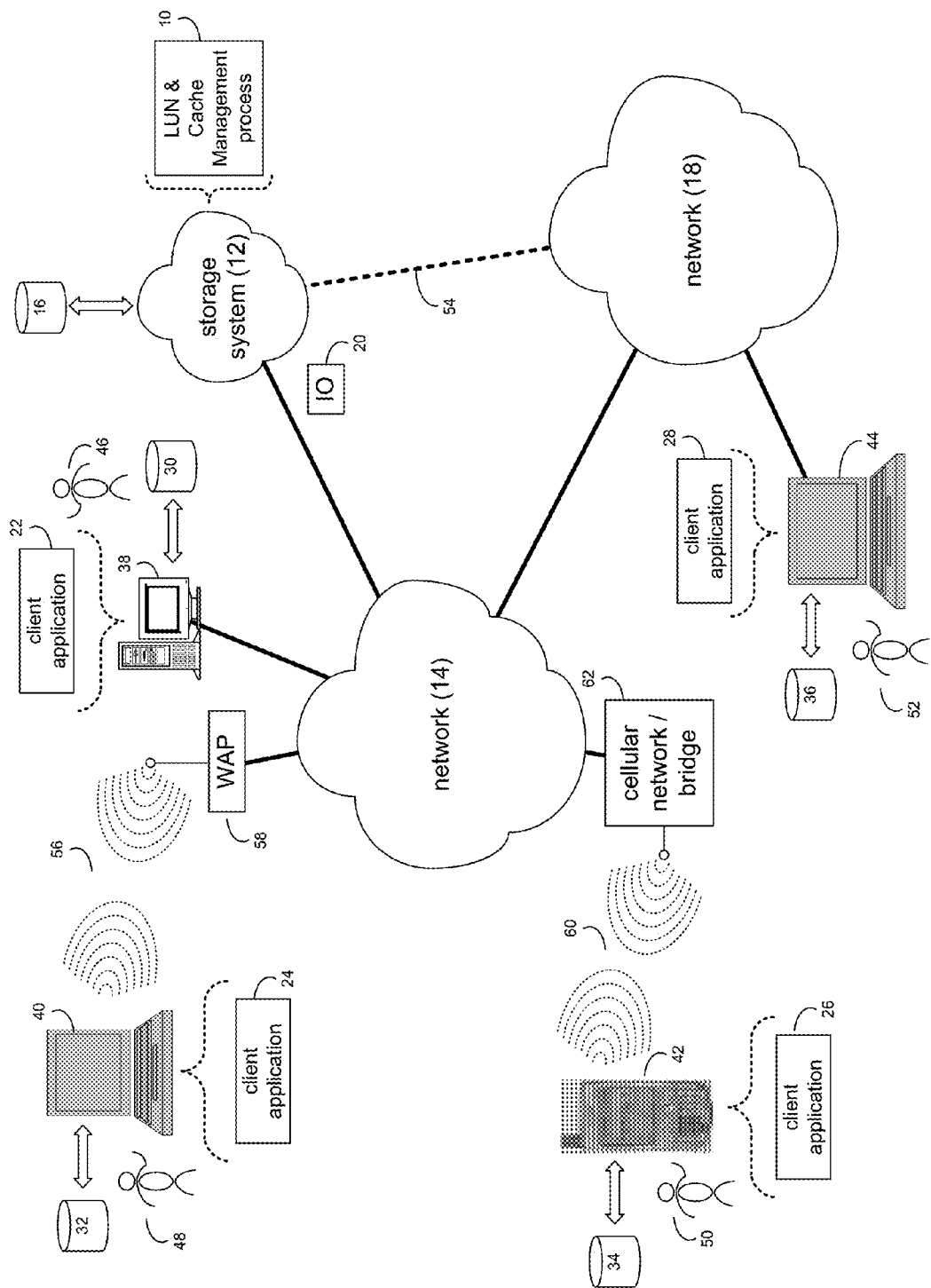
FIG. 1 is a diagrammatic view of a storage system and a LUN & cache management process coupled to a distributed computing network.

System Overview:

Referring to FIG. 1, there is shown LUN & cache management process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft Windows XP Server™; Novell Netware™; Redhat Linux™, Unix, or a custom operating system, for example.

The instruction sets and subroutines of LUN & cache management process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (i.e. a request that content be written to storage system 12) and data read requests (i.e. a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, personal digital assistant 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Personal digital assistant 42 is shown wirelessly coupled to network 14 via wireless communication channel 60 established between personal digital assistant 42 and cellular network/bridge 62, which is shown directly coupled to network 14.

Client electronic devices 38, 40, 42, 44 may each execute an operating system, examples of which may include but are not limited to Microsoft Windows™, Microsoft Windows CE™, Redhat Linux™, or a custom operating system.

For illustrative purposes, storage system 12 will be described as being a network-based storage system that includes a plurality of electro-mechanical backend storage devices. However, this is for illustrative purposes only and is not intended to be a limitation of this disclosure, as other configurations are possible and are considered to be within the scope of this disclosure. For example and as discussed above, storage system 12 may be a personal computer that includes a single electro-mechanical storage device.

Figure 2:
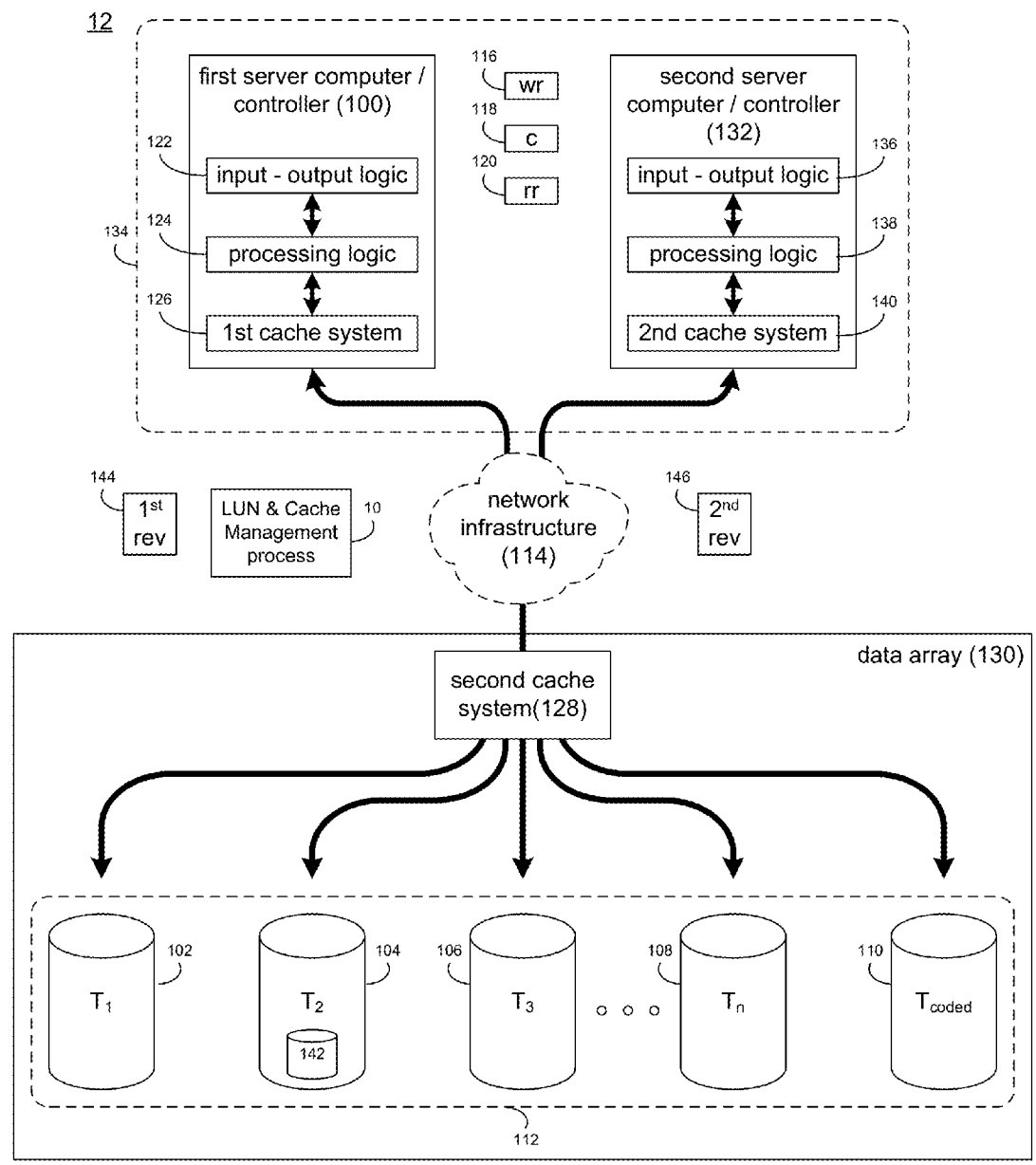
FIG. 2 is a diagrammatic view of the storage system of FIG. 1.

Referring also to FIG. 2, storage system 12 may include first server computer/controller 100 and a plurality of storage targets $T_{1-n}$ (e.g. storage targets 102, 104, 106, 108). Storage targets 102, 104, 106, 108 may be configured to provide various levels of performance and/or high availability. For example, one or more of storage targets 102, 104, 106, 108 may be configured as a RAID 0 array, in which data is striped across storage targets. By striping data across a plurality of storage targets, improved performance may be realized. However, RAID 0 arrays do not provide a level of high availability. Accordingly, one or more of storage targets 102, 104, 106, 108 may be configured as a RAID 1 array, in which data is mirrored between storage targets. By mirroring data between storage targets, a level of high availability is achieved as multiple copies of the data are stored within storage system 12.

While storage targets 102, 104, 106, 108 are discussed above as being configured in a RAID 0 or RAID 1 array, this is for illustrative purposes only and is not intended to be a limitation of this disclosure, as other configurations are possible. For example, storage targets 102, 104, 106, 108 may be configured as a RAID 3, RAID 4, RAID 5 or RAID 6 array.

While in this particular example, storage system 12 is shown to include four storage targets (e.g. storage targets 102, 104, 106, 108), this is for illustrative purposes only and is not intended to be a limitation of this disclosure. Specifically, the actual number of storage targets may be increased or decreased depending upon e.g. the level of redundancy/performance/capacity required.

Storage system 12 may also include one or more coded targets 110. As is known in the art, a coded target may be used to store coded data that may allow for the regeneration of data lost/corrupted on one or more of storage targets 102, 104, 106, 108. An example of such a coded target may include but is not limited to a hard disk drive that is used to store parity data within a RAID array.

While in this particular example, storage system 12 is shown to include one coded target (e.g., coded target 110), this is for illustrative purposes only and is not intended to be a limitation of this disclosure. Specifically, the actual number of coded targets may be increased or decreased depending upon e.g. the level of redundancy/performance/capacity required.

Examples of storage targets 102, 104, 106, 108 and coded target 110 may include one or more electro-mechanical hard disk drives, wherein a combination of storage targets 102, 104, 106, 108 and coded target 110 may form non-volatile, electro-mechanical memory system 112.

The manner in which storage system 12 is implemented may vary depending upon e.g. the level of redundancy/performance/capacity required. For example, storage system 12 may be a RAID device in which first server computer/controller 100 is a RAID controller card and storage targets 102, 104, 106, 108 and/or coded target 110 are individual "hot-swappable" hard disk drives. An example of such a RAID device may include but is not limited to an NAS device. Alternatively, storage system 12 may be configured as a SAN, in which first server computer/controller 100 may be e.g., a server computer and each of storage targets 102, 104, 106, 108 and/or coded target 110 may be a RAID device and/or computer-based hard disk drive. Further still, one or more of storage targets 102, 104, 106, 108 and/or coded target 110 may be a SAN.

In the event that storage system 12 is configured as a SAN, the various components of storage system 12 (e.g. first server computer/controller 100, storage targets 102, 104, 106, 108, and coded target 110) may be coupled using network infrastructure 114, examples of which may include but are not limited to an Ethernet (e.g., Layer 2 or Layer 3) network, a fiber channel network, an InfiniBand network, or any other circuit switched/packet switched network.

Storage system 12 may execute all or a portion of LUN & cache management process 10. The instruction sets and subroutines of LUN & cache management process 10, which may be stored on a storage device (e.g., storage device 16) coupled to first server computer/controller 100, may be executed by one or more processors (not shown) and one or more memory architectures (not shown) included within first server computer/controller 100. Storage device 16 may include but is not limited to: a hard disk drive; a tape drive; an optical drive; a RAID device; a random access memory (RAM); a read-only memory (ROM); and all forms of flash memory storage devices.

As discussed above, various IO requests (e.g. IO request 20) may be generated. For example, these IO requests may be sent from client applications 22, 24, 26, 28 to storage system 12. Additionally/alternatively and when first server computer/controller 100 is configured as an application server, these IO requests may be internally generated within first server computer/controller 100. Examples of IO request 20 may include but are not limited to data write request 116 (i.e. a request that content 118 be written to storage system 12) and data read request 120 (i.e. a request that content 118 be read from storage system 12).

First server computer/controller 100 may include input-output logic 122 (e.g., a network interface card or a Host Bus Adaptor (HBA)), processing logic 124, and first cache system 126. Examples of first cache system 126 may include but are not limited to a volatile, solid-state, cache memory system (e.g., a dynamic RAM cache memory system) and/or a non-volatile, solid-state, cache memory system (e.g., a flash-based, cache memory system).

During operation of first server computer/controller 100, content 118 to be written to storage system 12 may be received by input-output logic 122 (e.g. from network 14 and/or network 18) and processed by processing logic 124. Additionally/alternatively and when first server computer/controller 100 is configured as an application server, content 118 to be written to storage system 12 may be internally generated by first server computer/controller 100. As will be discussed below in greater detail, processing logic 124 may initially store content 118 within first cache system 126.

Depending on the manner in which first cache system 126 is configured, processing logic 124 may immediately write content 118 to second cache system 128/non-volatile, electro-mechanical memory system 112 (if first cache system 126 is configured as a write-through cache) or may subsequently write content 118 to second cache system 128/non-volatile, electro-mechanical memory system 112 (if first cache system 126 is configured as a write-back cache). Additionally and in certain configurations, processing logic 124 may calculate and store coded data on coded target 110 (included within non-volatile, electromechanical memory system 112) that may allow for the regeneration of data lost/corrupted on one or more of storage targets 102, 104, 106, 108. For example, if processing logic 124 was included within a RAID controller card or an NAS/SAN controller, processing logic 124 may calculate and store coded data on coded target 110. However, if processing logic 124 was included within e.g., an applications server, data array 130 may calculate and store coded data on coded target 110.

Examples of second cache system 128 may include but are not limited to a volatile, solid-state, cache memory system (e.g., a dynamic RAM cache memory system) and/or a non-volatile, solid-state, cache memory system (e.g., a flash-based, cache memory system).

The combination of second cache system 128 and non-volatile, electromechanical memory system 112 may form data array 130, wherein first cache system 126 may be sized so that the number of times that data array 130 is accessed may be reduced. Accordingly, by sizing first cache system 126 so that first cache system 126 retains a quantity of data sufficient to satisfy a significant quantity of TO requests (e.g., TO request 20), the overall performance of storage system 12 may be enhanced.

Further, second cache system 128 within data array 130 may be sized so that the number of times that non-volatile, electromechanical memory system 112 is accessed may be reduced. Accordingly, by sizing second cache system 128 so that second cache system 128 retains a quantity of data sufficient to satisfy a significant quantity of TO requests (e.g., TO request 20), the overall performance of storage system 12 may be enhanced.

As discussed above, the instruction sets and subroutines of LUN & cache management process 10, which may be stored on storage device 16 included within storage system 12, may be executed by one or more processors (not shown) and one or more memory architectures (not shown) included within storage system 12. Accordingly, in addition to being executed on first server computer/controller 100, some or all of the instruction sets and subroutines of LUN & cache management process 10 may be executed by one or more processors (not shown) and one or more memory architectures (not shown) included within data array 130.

Figure 3:
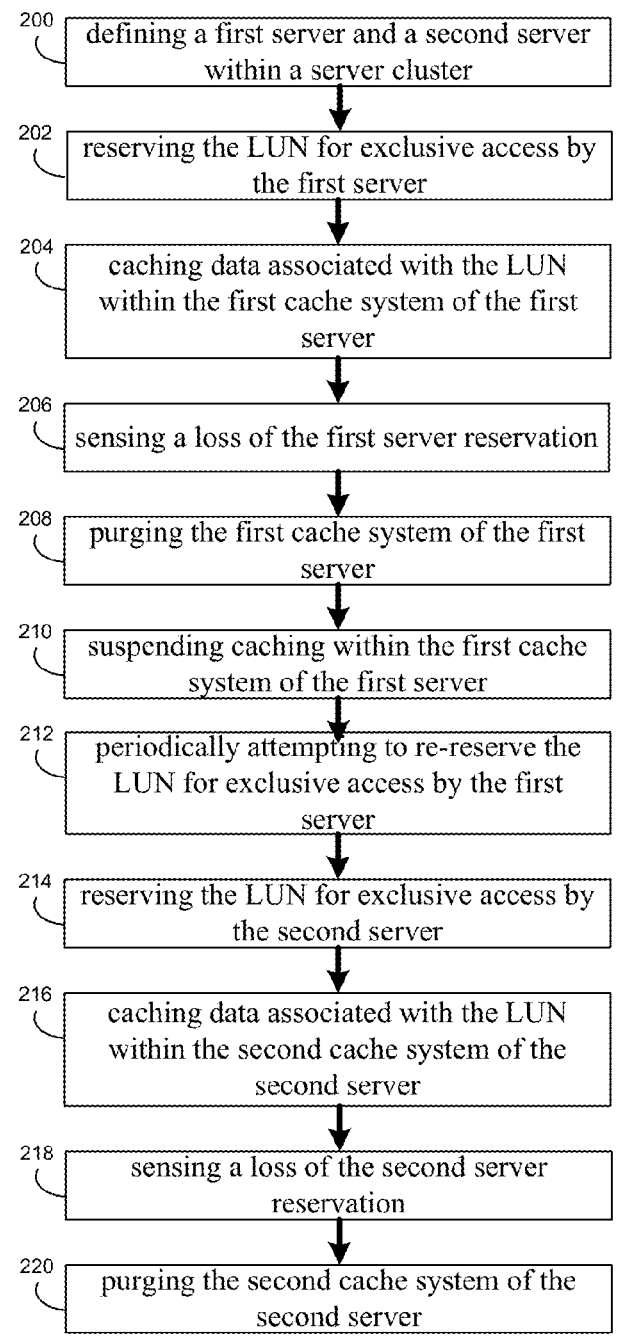
FIG. 3 is a flow chart of one implementation of the LUN & cache management process of FIG. 1.

The LUN & Cache Management Process:

Referring also to FIG. 3, LUN & cache management process 10 may define 200 a first server (e.g., first server computer/controller 100) and a second server (e.g., second server computer/controller 132) within a server cluster (e.g., server cluster 134). As discussed above, the first server (e.g., first server computer/controller 100) may include first cache system 126. The first server (e.g., first server computer/controller 100) and the second server (e.g., second server computer/controller 132) may be coupled to data array 130.

Second server computer/controller 132 may be configured to be activated by LUN & cache management process 10 in the event of a failure of first server computer/controller 100. Accordingly, first server computer/controller 100 may be configured as an active host within server cluster 134 and second server computer/controller 132 may be configured as a passive host within server cluster 134. Alternatively, second server computer/controller 132 may be configured by LUN & cache management process 10 to be active while first server computer/controller 100 is also active, thus resulting in two server computers/controllers being simultaneously active within server cluster 134.

Second server computer/controller 132 may include input-output logic 136 (e.g., a network interface card or a Host Bus Adaptor (HBA)), processing logic 138, and second cache system 140. Examples of second cache system 140 may include but are not limited to a volatile, solid-state, cache memory system (e.g., a dynamic RAM cache memory system) and/or a non-volatile, solid-state, cache memory system (e.g., a flash-based, cache memory system). The instruction sets and subroutines of LUN & cache management process 10 may also be executed by one or more processors (not shown) and one or more memory architectures (not shown) included within second server computer/controller 132.

Assume that when initially started, LUN 142 (which is defined within data array 130) is not assigned to a host. Further, assume that upon booting, the first server (e.g., first server computer/controller 100) wants to control LUN 142. Accordingly, LUN & cache management process 10 may reserve 202 LUN 142 for exclusive access by the first server (e.g., first server computer/controller 100) by generating first reservation 144. First reservation 144 may identify the first server (e.g., first server computer/controller 100) as the only server that may write data to LUN 142 and may include a unique name (e.g., Cache 1) for first cache system 126 included within the first server (e.g., first server computer/controller 100). This unique name (e.g., Cache 1) may be stored within data array 130 and may be used to identify first cache system 126 as the cache system that is used for caching data stored within LUN 142.

Once the above-described reservation process is complete, LUN & cache management process 10 may cache 204 data associated with LUN 142 within first cache system 126 of the first server (e.g., first server computer/controller 100).

Specifically, assume for illustrative purposes that the combination of the first server (e.g., first server computer/controller 100) and LUN 142 is operating properly and the first server (e.g., first server computer/controller 100) is executing various write requests (e.g. write request 116) and various read requests (e.g., read request 120) concerning LUN 142.

As discussed above and when processing a write request (e.g. write request 116), processing logic 124 of the first server (e.g., first server computer/controller 100) may initially store content 118 within first cache system 126. Depending on the manner in which first cache system 126 is configured, processing logic 124 may immediately write content 118 to LUN 142 within data array 130 (if first cache system 126 is configured as a write-through cache) or may subsequently write content 118 to LUN 142 within data array 130 (if first cache system 126 is configured as a write-back cache). Additionally and when processing a read request (e.g., read request 120), data obtained from LUN 142 within data array 130 may be written to first cache system 126.

LUN & cache management process 10 may monitor the operation of LUN 142 to ensure that first server computer/controller 100 is the only server computer/controller that is accessing LUN 142. As discussed above and in this example, first server computer/controller 100 reserved LUN 142 for exclusive access by the first server computer/controller 100. Further and as discussed above, once the reservation in complete, LUN & cache management process 10 may cache 204 data associated with LUN 142 within first cache system 126 of first server computer/controller 100. Accordingly, in the event that another server computer/controller (e.g., second server computer/controller 132) writes data to LUN 142, a data mismatch may occur between the data included within first cache 126 and the data included within LUN 142.

Assume for illustrative purposes that second server computer/controller 132 is activated and begins to write data to LUN 142, resulting in the possibility of the above-described data mismatch situation occurring. As an additional server (e.g., second server computer/controller 132) is also writing to LUN 142, this situation results in the breaking of first reservation 144, since first server computer/controller 100 no longer has exclusive access to LUN 142.

Upon LUN & cache management process 10 sensing 206 the loss of first server reservation 144, LUN & cache management process 10 may purge 208 first cache system 126 of the first server (e.g., first server computer/controller 100). Specifically and as discussed above, once another server computer/controller (i.e., other than first server computer/controller 100) writes data to LUN 142, there may be a data mismatch situation between the data included within first cache 126 and the data included within LUN 142.

For example, assume that first server computer/controller 100 wrote "Data Chunk A" to first cache system 126 and subsequently to "LBA 1" of LUN 142. In the event that a data read request is subsequently received by first server computer/controller 100 for the data chunk stored within "LBA 1" of LUN 142 (namely "Data Chunk A"), a cache hit event will occur since a copy of "Data Chunk A" is locally stored within first cache system 126. Therefore, the data read request for "Data Chunk A" may be satisfied by providing the locally-cached copy of "Data Chunk A" from first cache system 126, thus avoiding the delay and computational expense of having to obtain the "Data Chunk A" from data array 130.

However, if e.g., second server computer/controller 132 had subsequently written "Data Chunk B" to "LBA 1" of LUN 142 and the above-described data read request is then received by first server computer/controller 100 for the data chunk stored within "LBA 1" of LUN 142 (which is currently "Data Chunk B"), there is a data mismatch event occurring. Specifically, first server computer/controller 100 will believe that a cache hit event has occurred, since a copy of "Data Chunk A" is locally stored within first cache system 126 and first server computer/controller 100 believes that "Data Chunk A" is currently stored within "LBA 1" of LUN 142. However, since second server computer/controller 132 had written "Data Chunk B" to "LBA 1" of LUN 142, if first server computer/controller 100 satisfies the data read request received by providing the locally-cached copy of "Data Chunk A", this is a data mismatch since (unbeknownst to first server computer/controller 100) "Data Chunk B" is currently stored within "LBA 1" of LUN 142.

Accordingly and to avoid such a situation, upon LUN & cache management process 10 sensing 206 the loss of first server reservation 144, LUN & cache management process 10 may purge 208 first cache system 126 of the first server (e.g., first server computer/controller 100). Further, in response to the loss of first server reservation 144, LUN & cache management process 10 may suspend 210 caching within first cache system 126 of the first server (e.g., first server computer/controller 100). Accordingly, LUN & cache management process 10 may no longer write data chunks to or read data chunks from first cache system 126. Therefore, when the above-described data read request is received by first server computer/controller 100 for the data chunk stored within "LBA 1" of LUN 142, LUN & cache management process 10 may satisfy such a data read request by obtaining the data chuck requested directly from LUN 142 (thus avoiding any data mismatch situations).

Further and in response to a loss of first server reservation 144, LUN & cache management process 10 may periodically attempt 212 to re-reserve LUN 142 for exclusive access by the first server (e.g., first server computer/controller 100). As discussed above, upon the booting of first server computer/controller 100, LUN & cache management process 10 may generate first reservation 144 to reserve 202 LUN 142 for exclusive access by the first server (e.g., first server computer/controller 100). Accordingly and at defined intervals, first server computer/controller 100 may generate a new reservation to re-reserve LUN 142 for exclusive access by the first server (e.g., first server computer/controller 100.

In the event that second server computer/controller 132 continues to write data to LUN 142, the new reservation of LUN 142 for first server computer/controller 100 may once again be lost and, upon LUN & cache management process 10 sensing 206 the loss of this new reservation, LUN & cache management process 10 may again purge 208 first cache system 126 of first server computer/controller 100.

As discussed above, second server computer/controller 132 may include second cache system 140. Continuing with the above-stated example, assume that upon being activated (and writing data to LUN 142/breaking first reservation 144), the second server (e.g., second server computer/controller 132) wants to control LUN 142.

Accordingly, LUN & cache management process 10 may reserve 214 LUN 142 for exclusive access by the second server (e.g., second server computer/controller 132) by generating second reservation 146. Second reservation 146 may identify the second server (e.g., second server computer/controller 132) as the only server that may write data to LUN 142 and may include a unique name (e.g., Cache 2) for second cache system 140 included within the second server (e.g., second server computer/controller 132). This unique name (e.g., Cache 2) may be stored within data array 130 and may be used to identify second cache system 140 as the cache system that is used for caching data stored within LUN 142.

Once the above-described reservation process is complete, LUN & cache management process 10 may cache 216 data associated with LUN 142 within second cache system 140 of the second server (e.g., second server computer/controller 132). Accordingly, when processing a write request (e.g. write request 116), processing logic 138 of the second server (e.g., second server computer/controller 132) may initially store content 118 within second cache system 140. Depending on the manner in which second cache system 140 is configured, processing logic 138 may immediately write content 118 to LUN 142 within data array 130 (if second cache system 140 is configured as a write-through cache) or may subsequently write content 118 to LUN 142 within data array 130 (if second cache system 140 is configured as a write-back cache). Additionally and when processing a read request (e.g., read request 120), data obtained from LUN 142 within data array 130 may be written to second cache system 140.

LUN & cache management process 10 may monitor the operation of LUN 142 to ensure that second server computer/controller 132 is the only server computer/controller that is accessing LUN 142. Accordingly, in the event that another server computer/controller (e.g., first server computer/controller 100) writes data to LUN 142, a data mismatch may occur between the data included within second cache 140 and the data included within LUN 142.

Assume for illustrative purposes that first server computer/controller 100 once again begins to write data to LUN 142, resulting in the possibility of the above-described data mismatch situation occurring. As an additional server (e.g., first server computer/controller 100) is also writing data to LUN 142, this situation results in the breaking of second reservation 146, since second server computer/controller 132 no longer has exclusive access to LUN 142.

Upon LUN & cache management process 10 sensing 218 the loss of second server reservation 146, LUN & cache management process 10 may purge 220 second cache system 140 of the second server (e.g., second server computer/controller 132). Specifically and as discussed above, once another server computer/controller (i.e., other than second server computer/controller 132) writes data to LUN 142, there may be a data mismatch situation between the data included within second cache 140 and the data included within LUN 142. To avoid such a situation, upon LUN & cache management process 10 sensing 218 the loss of second server reservation 146, LUN & cache management process 10 may purge 220 second cache system 140 of second server computer/controller 132) and may suspend caching within second cache system 140 of second server computer/controller 132). Accordingly, LUN & cache management process 10 may no longer write data chunks to or read data chunks from second cache system 140.

While the first server (e.g., first server computer/controller 100) is described above as generating reservation 144 upon booting, other configurations are possible and are considered to be within the scope of this disclosure. For example, at some point after booting but prior to caching data within first cache system 126, the first server (e.g., first server computer/controller 100) may generate reservation 144 that may be provided to LUN & cache management process 10.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method comprising: defining a first server and a second server within a server cluster, wherein the first server includes a first cache system, and the first and second servers are coupled to a data array that includes a LUN;
    reserving the LUN for exclusive access by the first server, thus generating a first server reservation;
    caching data associated with the LUN within the first cache system of the first server;
    sensing a loss of the first server reservation, wherein the loss of the first server reservation is in response to the second server accessing the LUN; and
    in response to a loss of the first server reservation, purging the first cache system of the first server; and
    in response to a loss of the first server reservation, suspending caching within the first cache system of the first server; and
    in response to a loss of the first server reservation, periodically attempting to re-reserve the LUN for exclusive access by the first server; and
    in response to the loss of the first server reservation, the second server reserves the LUN for exclusive access by the second server by providing a unique name that is stored within a data structure and identifies the second server as the only server accessing the LUN.

2. The computer-implemented method of claim 1 wherein the second server includes a second cache system, the method further comprising:

reserving the LUN for exclusive access by the second server, thus generating a second server reservation.

3. The computer-implemented method of claim 2 further comprising:
caching data associated with the LUN within the second cache system of the second server.

4. The computer-implemented method of claim 3 further comprising:
sensing a loss of the second server reservation; and
in response to sensing a loss of the second server reservation, purging the second cache system of the second server.

5. A computer program product residing on a non-transitory computer readable medium having a plurality of instructions stored thereon which, when executed by a processor, cause the processor to perform operations comprising:
defining a first server and a second server within a server cluster, wherein the first server includes a first cache system, and the first and second servers are coupled to a data array that includes a LUN;
reserving the LUN for exclusive access by the first server, thus generating a first server reservation;
caching data associated with the LUN within the first cache system of the first server;
sensing a loss of the first server reservation, wherein the loss of the first server reservation is in response to the second server accessing the LUN; and
in response to a loss of the first server reservation, purging the first cache system of the first server; and
in response to a loss of the first server reservation, suspending caching within the first cache system of the first server; and
in response to a loss of the first server reservation, periodically attempting to re-reserve the LUN for exclusive access by the first server; and
in response to the loss of the first server reservation, the second server reserves the LUN for exclusive access by the second server by providing a unique name that is stored within a data structure and identifies the second server as the only server accessing the LUN.

6. The computer program product of claim 5 wherein the second server includes a second cache system, the method further comprising instructions for:
reserving the LUN for exclusive access by the second server, thus generating a second server reservation.

7. The computer program product of claim 6 further comprising instructions for:
caching data associated with the LUN within the second cache system of the second server.

8. The computer program product of claim 7 further comprising instructions for:
sensing a loss of the second server reservation; and
in response to sensing a loss of the second server reservation, purging the second cache system of the second server.

9. A computing system including at least one processor and at least one memory architecture coupled with the at least one processor, wherein the computing system is configured to perform operations comprising:
defining a first server and a second server within a server cluster, wherein the first server includes a first cache system, and the first and second servers are coupled to a data array that includes a LUN;
reserving the LUN for exclusive access by the first server, thus generating a first server reservation;
caching data associated with the LUN within the first cache system of the first server;
sensing a loss of the first server reservation, wherein the loss of the first server reservation is in response to the second server accessing the LUN; and
in response to a loss of the first server reservation, purging the first cache system of the first server; and
in response to a loss of the first server reservation, suspending caching within the first cache system of the first server; and
in response to a loss of the first server reservation, periodically attempting to re-reserve the LUN for exclusive access by the first server; and
in response to the loss of the first server reservation, the second server reserves the LUN for exclusive access by the second server by providing a unique name that is stored within a data structure and identifies the second server as the only server accessing the LUN.

10. The computing system of claim 9 wherein the second server includes a second cache system, the computing system further configured to perform operations comprising:
reserving the LUN for exclusive access by the second server, thus generating a second server reservation.

11. The computing system of claim 10 further configured to perform operations comprising:
caching data associated with the LUN within the second cache system of the second server.

12. The computing system of claim 11 further configured to perform operations comprising:
sensing a loss of the second server reservation; and
in response to sensing a loss of the second server reservation, purging the second cache system of the second server.

* * * * *